W. H. DEMOSS.
Implements for Taking Nails Out of Kegs.

No. 150,302.                                Patented April 28, 1874.

WITNESSES.                                  INVENTOR,

William H. Demoss,

By

ATTORNEYS.

UNITED STATES PATENT OFFICE.

WILLIAM H. DEMOSS, OF CENTREVILLE, INDIANA.

IMPROVEMENT IN IMPLEMENTS FOR TAKING NAILS OUT OF KEGS.

Specification forming part of Letters Patent No. 150,302, dated April 28, 1874; application filed March 14, 1874.

*To all whom it may concern:*

Be it known that I, WILLIAM H. DEMOSS, of Centreville, in the county of Wayne and State of Indiana, have invented a new and valuable Improvement in Implement for Taking Nails out of Kegs; and I do hereby declare that the following is a full, clear, and exact description of the construction and operation of the same, reference being had to the annexed drawings making a part of this specification, and to the letters and figures of reference marked thereon.

Figure 1:
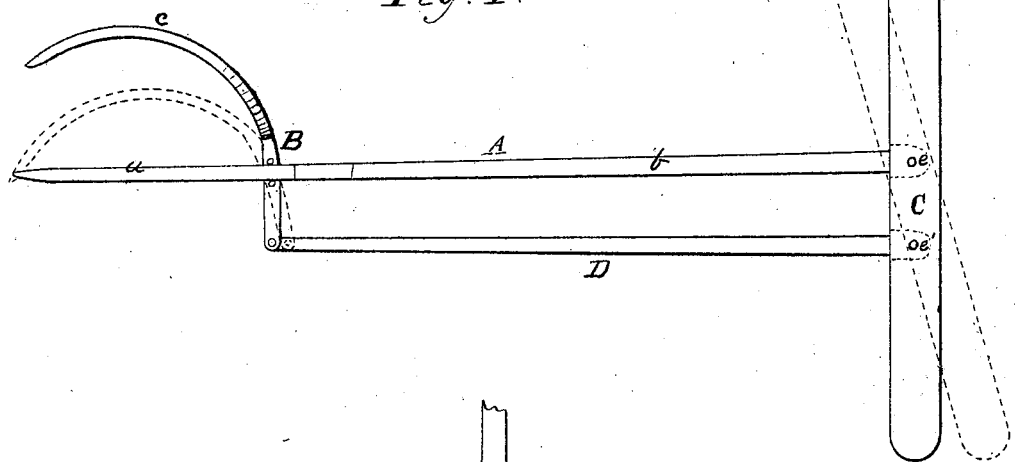
Figure 2:
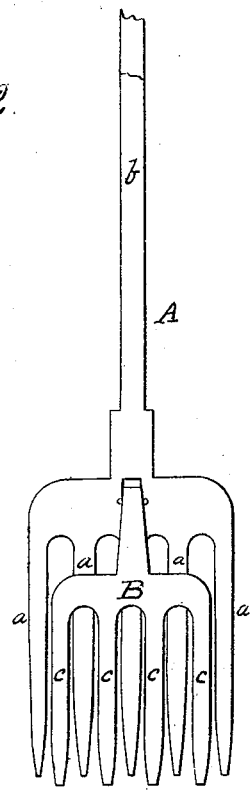

Figure 1 of the drawings is a representation of a side view of my nail-grab, and Fig. 2 is a plan view of the same.

This invention has relation to means for taking nails or other unyielding articles of limited size out of a keg or other receptacle; and it consists in the construction and novel arrangement of the main fork having straight prongs, the curve-tined grab pivoted thereto, the connecting-rod, and the lever-handle pivoted to the ends of the main shank and connecting-rod, as hereinafter more fully described.

In the accompanying drawings, the letter A designates the main fork, having straight tines $a$ and a shank, $b$, of suitable length. B indicates the grab, consisting of a short lever pivoted to the main fork and terminating in bent prongs $c$, the concave edges of which are turned toward the straight prongs of the main fork. The other end of the grab-lever is pivoted to a connecting-rod, D, which, running parallel or nearly so with the shank of the main fork, is in turn pivoted to the transverse operating-lever C, to which the end of the shank $b$ is also pivoted. These pivotal points $e$ and $e'$ are at a short distance from each other, so that when the operating lever or handle is moved upon them the effect is to open or close the grab with relation to the straight tines of the main fork.

The operation of this instrument is as follows: The handle being operated to open the grab, the straight tines of the main fork are inserted among the nails or other articles which it is desired to remove. In this action the requisite force employed in pressing the tines into the mass will not cause them to bend or be distorted, because they are straight and in the line of pressure. When the main fork has been inserted to the proper depth the handle is operated in the opposite direction to bring the prongs of the grab toward the tines of the main fork, thereby securely seizing whatever quantity may be within their grasp, which may then be readily lifted out of the receptacle.

If desirable, a grab may be arranged on each side of the straight tines of the main fork, thereby increasing the capacity of the instrument.

What I claim as new, and desire to secure by Letters Patent, is—

The implement described, consisting of the main fork A having straight prongs $a$, the curved grab-fork B pivoted thereto, the connecting-rod D, and the transverse lever C pivoted at points $e$ $e'$ to said main fork and connecting-rod, all constructed, combined, and operating in the manner as and for the purposes specified.

In testimony that I claim the above I have hereunto subscribed my name in the presence of two witnesses.

WILLIAM H. DEMOSS.

Witnesses:
JAMES W. WILSON,
JOHN E. PUGH.